(12) United States Patent
Gray, Jr.

(10) Patent No.: US 7,047,933 B2
(45) Date of Patent: *May 23, 2006

(54) LOW EMISSION FUEL FOR USE WITH CONTROLLED TEMPERATURE COMBUSTION, DIRECT INJECTION, COMPRESSION IGNITION ENGINES

(75) Inventor: Charles L. Gray, Jr., Pinckney, MI (US)

(73) Assignee: The United States of America as represented by the Administrator of the United States Environmental Protection Agency, Washington, DC (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/883,255

(22) Filed: Jul. 1, 2004

(65) Prior Publication Data

US 2004/0231650 A1     Nov. 25, 2004

Related U.S. Application Data

(63) Continuation-in-part of application No. 10/666,678, filed on Sep. 19, 2003, now Pat. No. 6,857,263, which is a continuation-in-part of application No. 10/214,229, filed on Aug. 8, 2002, now Pat. No. 6,651,432.

(51) Int. Cl.
    *F02D 41/04*    (2006.01)
    *F02M 25/07*    (2006.01)
    *F01N 3/10*     (2006.01)

(52) U.S. Cl. .................. 123/305; 123/568.21; 60/278

(58) Field of Classification Search ................ 123/1 A, 123/25 E, 25 F, 305, 435, 698, 699, 568.12, 123/568.14, 568.16, 568.21, 559.1, 559.2, 123/564; 60/278, 279, 280, 285, 602, 605.2
See application file for complete search history.

(56) References Cited

U.S. PATENT DOCUMENTS

| | | | | |
|---|---|---|---|---|
| 3,851,632 | A * | 12/1974 | Teshirogi et al. | 123/699 |
| 4,612,770 | A * | 9/1986 | Tadokoro et al. | 60/602 |
| 5,226,401 | A * | 7/1993 | Clarke et al. | 123/568.14 |
| 5,404,841 | A * | 4/1995 | Valentine | 123/25 E |
| 5,743,243 | A * | 4/1998 | Yanagihara | 123/568.12 |
| 5,778,857 | A * | 7/1998 | Nakamura et al. | 123/435 |
| 6,101,989 | A * | 8/2000 | Green | 123/568.14 |
| 6,637,381 | B1 * | 10/2003 | Stanglmaier et al. | 123/25 F |
| 6,857,263 | B1 * | 2/2005 | Gray et al. | 60/278 |

* cited by examiner

*Primary Examiner*—Willis R. Wolfe, Jr.
(74) *Attorney, Agent, or Firm*—David H. Read

(57) ABSTRACT

A low emission, direct injection, compression ignition, internal combustion engine operates with reduced charge-air oxygen concentration levels to control localized peak combustion temperatures and reduce NOx formation. Low cetane fuel, below 43 cetane, and most preferably with a cetane rating below 30, is utilized with the combustion system to reduce smoke and PM formation simultaneously with the reduced NOx formation. In a preferred embodiment, FCC Naptha fuel, with a cetane rating below 30 and an end boiling point below 120 degrees Celsius, is used with the combustion system together with the reduced charge-air oxygen concentration levels to produce engine-out NOx emissions of 0.2 g/bhp-hr or lower, and PM emissions at 0.01 g/bhp-hr or lower, without the need for NOx (and potentially PM) aftertreatment. Potential commercial applications of the fuel and combustion system are discussed, including application to vehicle fleets, with novel methods of operating a vehicle fleet (and of providing fuel to such fleets) to meet motor vehicle emissions regulations at a reduced cost also being disclosed.

38 Claims, 3 Drawing Sheets

LOW EMISSION FUEL FOR USE WITH CONTROLLED TEMPERATURE COMBUSTION, DIRECT INJECTION, COMPRESSION IGNITION ENGINES

CROSS REFERENCE TO RELATED APPLICATIONS

This application is a continuation-in-part of U.S. patent application Ser. No. 10/666,678, filed Sep. 19, 2003, now issued as U.S. Pat. No. 6,857,263, which application is a continuation-in-part of Ser. No. 10/214,229, filed Aug. 8, 2002 now-issued U.S. Pat. No. 6,651,432, "Controlled Temperature Combustion Engine", issued Nov. 25, 2003, both of which related applications are incorporated herein by reference in their entirety.

BACKGROUND OF THE INVENTION

1. Field of the Invention

The present invention relates to a fuel, and methods, for reducing harmful emissions, particularly engine-out smoke/PM levels, from engines of the direct injection compression ignition type, particularly diesel engines. The present invention also relates to methods of operating vehicle fleets, or providing fuel to vehicle fleets, to meet motor vehicle emissions regulations at a reduced cost.

2. Background of the Invention

The continuing use of diesel engines in motor vehicles greatly adds to the atmospheric presence of harmful pollutants such as nitrogen oxides (NOx) and particulate matter (PM). It is well-known that conventional diesel engines emit NOx and/or PM substantially in excess of acceptable environmental levels. For purposes of this invention, environmentally acceptable levels of diesel NOx emissions will be defined as 0.2 g/bhp-hr or lower, and environmentally acceptable levels of diesel PM emissions will be defined as 0.01 g/bhp-hr or lower, with or without exhaust aftertreatment.

Despite their harmful emissions, the use of diesel engines nevertheless provides significant advantages as well. For example, diesel engines are significantly more energy efficient than gasoline engines. Because of their fuel efficiency, resulting in lower operating fuel costs, diesel engines remain economically preferable to gasoline engines for many applications where fuel costs are important, such as with larger vehicles and vehicle fleets.

Attempts to reduce NOx and PM emissions from diesel engines, without sacrificing the fuel efficiency benefits of diesel engines or significantly increasing the cost of diesel engines or fuel, have therefore continued for many years, with much improvement still to be made.

To meet upcoming environmental regulations as to NOx and PM emissions for diesel engines, the diesel industry has turned primarily to development of NOx and PM aftertreatments (i.e. post-engine, but before the exhaust gas is released to the atmosphere) to keep emissions within environmentally acceptable levels. However, currently many in the diesel industry view such aftertreatment systems as expensive, as retaining issues of effectiveness and durability, and as creating size ("packaging") concerns. Because of these perceived problems with the expense and performance of such aftertreatment systems, it is desirable to develop an alternative; namely, a commercially acceptable diesel combustion system and method that can meet environmentally acceptable levels of NOx emissions (i.e. 0.2 g/bhp-hr or lower) and PM emissions without the need for aftertreatment, or with reduced aftertreatment needs, to reduce costs.

The parent applications hereto, incorporated by reference above, set forth a commercially acceptable diesel combustion system that can meet environmentally acceptable levels of NOx emissions (i.e. 0.2 g/bhp-hr or lower) without NOx aftertreatment, and with PM levels that are manageable with current PM aftertreatment technology. Engines that operate in accordance this combustion system, and potentially alternative combustion systems with the same goal (i.e., in keeping peak combustion temperatures below significant NOx forming levels), shall be referred to herein collectively as "Controlled Temperature Combustion" engines.

Even with these advances, it remains desirable to bring about continuing reductions in engine-out PM emissions (i.e. before aftertreatment) in Controlled Temperature Combustion engines, to further reduce PM aftertreatment costs. For example, further reduction of engine-out PM emissions may allow foregoing the use of a PM trap altogether with such engines, or use of a less expensive PM trap, or allow less frequent trap regeneration, as the frequency of required trap regeneration in diesel engines is dependent upon the engine-out PM emission levels.

Meanwhile, given the volatile and/or rising costs of fuel for internal combustion engines worldwide, it would also be desirable to reduce the cost of fuel for use with Controlled Temperature Combustion engines, just as with any internal combustion engine. One method of reducing the cost of fuel for Controlled Temperature Combustion direct injection compression ignition engines would be to enable use of less demanded fuels and fuels within a wider range of fuel specifications for such engines, which would increase the percentage of crude oil that can economically be made into fuel for such engines, beyond that which is typically used for making conventional diesel fuel. For example, providing a fuel that is suitable for use with Controlled Temperature Combustion direct injection compression ignition engines, from cuts or blends of fuel that previously would not be suitable for use in direct injection compression ignition engines and which are in less demand, may reduce fuel costs for such engines.

OBJECTS OF THE INVENTION

It is therefore an object of the present invention to provide a method for reducing the PM/smoke emissions for a Controlled Temperature Combustion, direct injection, compression ignition engine.

It is also an object of the present invention to provide a low emission fuel for Controlled Temperature Combustion direct injection compression ignition engines, which would allow for reduced fuel costs in operation of such engines.

DESCRIPTION OF THE RELATED ART

As established by federal regulations regarding fuels and fuel additives, diesel fuels sold in the United States for use in motor vehicles currently must have a cetane index of at least 40. 40 C.F.R. § 80.29. The cetane rating is a measure of the fuel's ignition delay, namely, the time between the start of fuel injection and the start of combustion, as determined by standardized test methods, with a higher number indicating less ignition delay. It is generally accepted in the prior art that higher cetane ratings provide better combustion for conventional diesel engines, with most diesel engines requiring, or running best with, fuels with a cetane rating above 45.

Although the tendency in the prior art is to move to higher cetane diesel fuels, there are isolated references for experimental engines, alternative engines, and fuel additives in the prior art that have been contemplated for use with very low cetane fuels (i.e. with a cetane index below 40). One example of such a reference is U.S. Patent Application Publication No. 2003/0052041 to Erwin, published Mar. 20, 2003. Erwin discloses possible use of very low cetane fuels with an Homogenous Charge Compression Ignition (HCCI) engine. One theory of use of a low cetane fuel with such a premixed type of combustion (as opposed to the non-premixed type of combustion existing in direct injection engines), is that the delayed combustion from a reduced cetane number would enable greater premixing of the fuel and air before combustion. Other examples of low cetane fuel compositions are found in U.S. Pat. No. 4,678,479, to Holmes, and U.S. Patent Application Publication No. 2002/0092228, to Ahmed. However, low cetane fuels have not been accepted in the market to date. Attempts to use low cetane fuel formulations in conjunction with conventional diesel engines and combustion methods would result in poor combustion and higher levels of harmful emissions, and thus is not currently utilized in the art.

SUMMARY OF THE INVENTION

Applicant has found that use of a fuel with a substantially lower cetane number than conventional diesel fuel effectuates a significant reduction in smoke/PM formation in direct injection compression ignition engines of the type disclosed in the parent applications hereto. In a preferred embodiment, an FCC Naptha fuel is used in conjunction with a controlled temperature combustion diesel engine (which uses low charge-air oxygen concentrations to reduce NOx formation, as more fully disclosed in the parent applications hereto), creating essentially smokeless engine-out combustion simultaneously with keeping engine-out NOx below 0.2 g/bhp-hr.

DETAILED DESCRIPTION OF THE INVENTION

Figure 1:
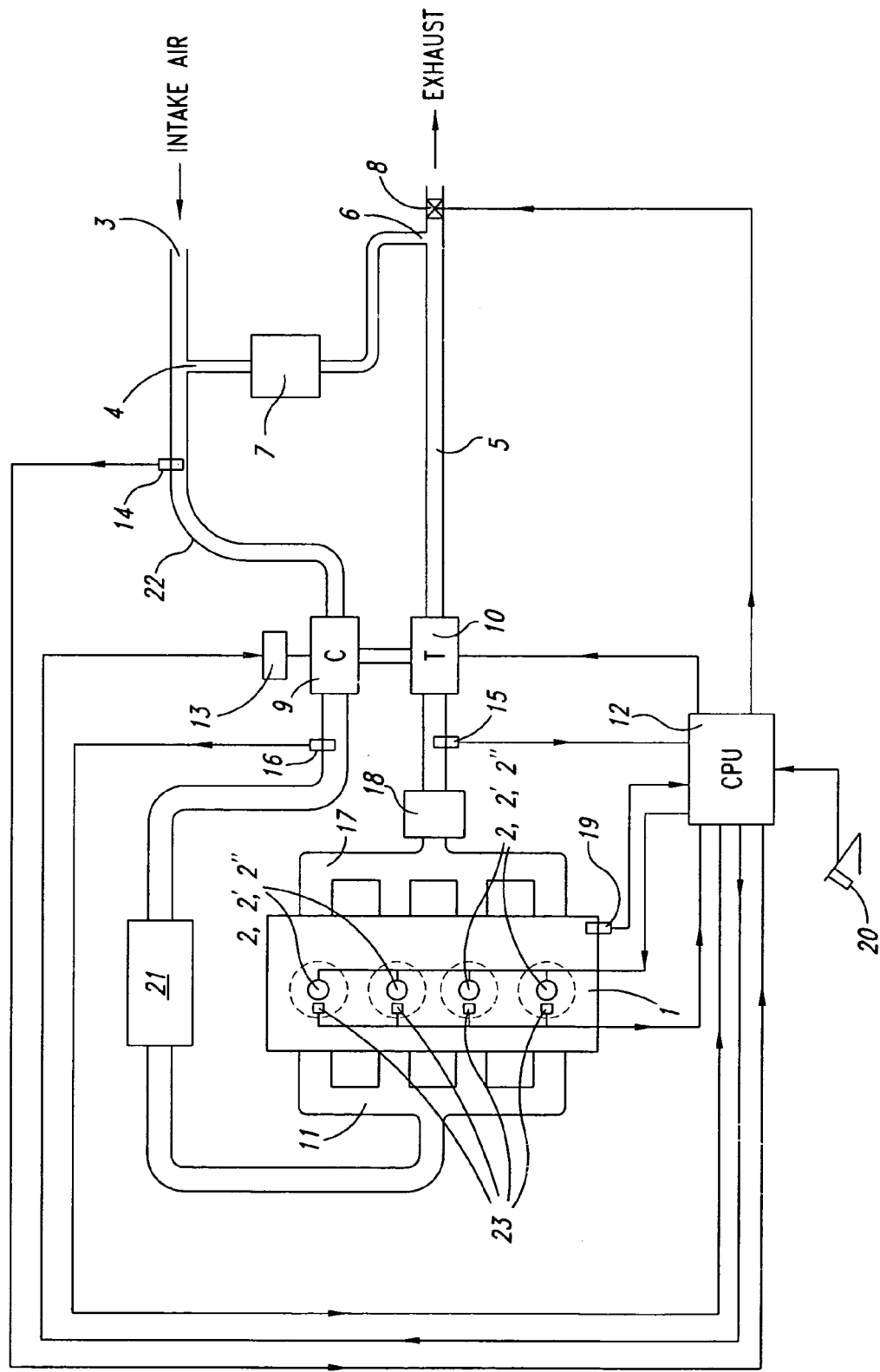
FIG. 1 is a schematic view of a preferred embodiment of a direct injection compression ignition internal combustion system for use with the present invention.

A preferred controlled temperature combustion, direct injection, compression ignition engine system for use with the present invention is schematically presented in FIG. 1. Referring to FIG. 1, the air handling system for engine 1 will first be explained. Ambient air enters an air intake line 22 for the system at port 3. A portion of exhaust gas in exhaust line 5 of the system is routed from the exhaust line 5 at port 6 through exhaust gas cooler 7 to port 4, where the recirculated exhaust gas blends with the ambient air at port 4, thereby forming a charge-air mixture in the air intake line 22. EGR control valve 8 is located just downstream of port 6 in exhaust line 5. By restricting flow through valve 8, exhaust gas flow rate through port 6 is adjusted, and oxygen concentration of the charge-air mixture may be determined and controlled, as will be discussed later.

The combined ambient air and recirculated exhaust gas (collectively "charge-air") flows through the intake air line 22 and is compressed by compressor 9. Compressor 9 may be a single stage compressor or two or more compressors in series or parallel, and is primarily driven by exhaust gas expander (turbine) motor 10 (which may be a single stage turbine or two or more turbines in series or parallel) to provide a controlled boost pressure level to intake manifold 11. Controller (CPU) 12 sends appropriate signals to expander motor 10 to control boost. An optional electric or hydraulic motor 13 may be used and controlled by controller 12 to provide rapid boost level changes to assist the exhaust expander motor 10 in providing rapid torque response. Alternatively, a supercharger (within the compressor 9 representation) may be used to provide more rapid torque response and additional boost capability. Controller 12 therefore sends appropriate signals to motor 13 and/or to the supercharger 9 to control boost level during transients and during any operating conditions where motor 10 alone cannot supply sufficient and fast boost pressure. Compressed charge-air may optionally (and preferably) flow through cooler 21 to intake manifold 11 to cool the charge-air to specified levels, if desired.

Optional oxygen sensor 14, placed in the intake line downstream of combining recirculated exhaust gas with the ambient air, may be used to directly determine the oxygen concentration in the charge-air. In addition, or in the alternative, an exhaust oxygen sensor 15 may be used. Charge-air oxygen concentration may then be determined by controller 12 from the exhaust oxygen concentration and EGR ratio, or by other means. Charge-air oxygen concentration may also be calculated or determined from other sensed parameters (not necessarily shown) by methods well-known to those skilled in the art. Controller 12 may then operate to control and maintain charge-air oxygen concentration levels to desired ranges, by effectuating adjustments to EGR valve 8, or by other means, as known in the art. For medium and high load engine operation, the charge-air oxygen concentration is maintained preferably below 16%, more preferably between 11% and 15%, and most preferably between 12% and 14%.

Charge-air may enter the combustion chamber (not shown) through conventional valves (not shown) in a conventional manner. Engine 1 receives fuel through direct cylinder fuel injectors 2, 2', 2", etc., and combustion occurs. Engine operation and fuel injection operation are monitored and controlled by controller 12. For example, current engine speed is provided to controller 12 by speed sensor 19. Current torque command level is provided to controller 12 by accelerator pedal sensor 20.

Exhaust gases may leave the combustion chamber through conventional valves (not shown) and leave engine 1 through exhaust manifold 17. Optional exhaust aftertreatment device 18 may include a particulate trap oxidizer to remove particulate emissions, and a catalyst to oxidize residual fuel and carbon monoxide in the exhaust.

In an alternative embodiment, for additional capability, optional ignition timing sensor 23 is utilized to determine ignition timing. The determined ignition timing is communicated to controller 12, which compares the ignition timing against a target value, and effectuates adjustments to fuel injection timing or other factors as needed to maintain ignition timing to at or near the target value. This allows the engine combustion to adapt to changes in cetane number in the fuels used for the combustion system. Such an adjustment mechanism is known and described in the art, for example, in U.S. Pat. No. 6,606,979 to Kimura, which is incorporated herein by reference.

Figure 2:
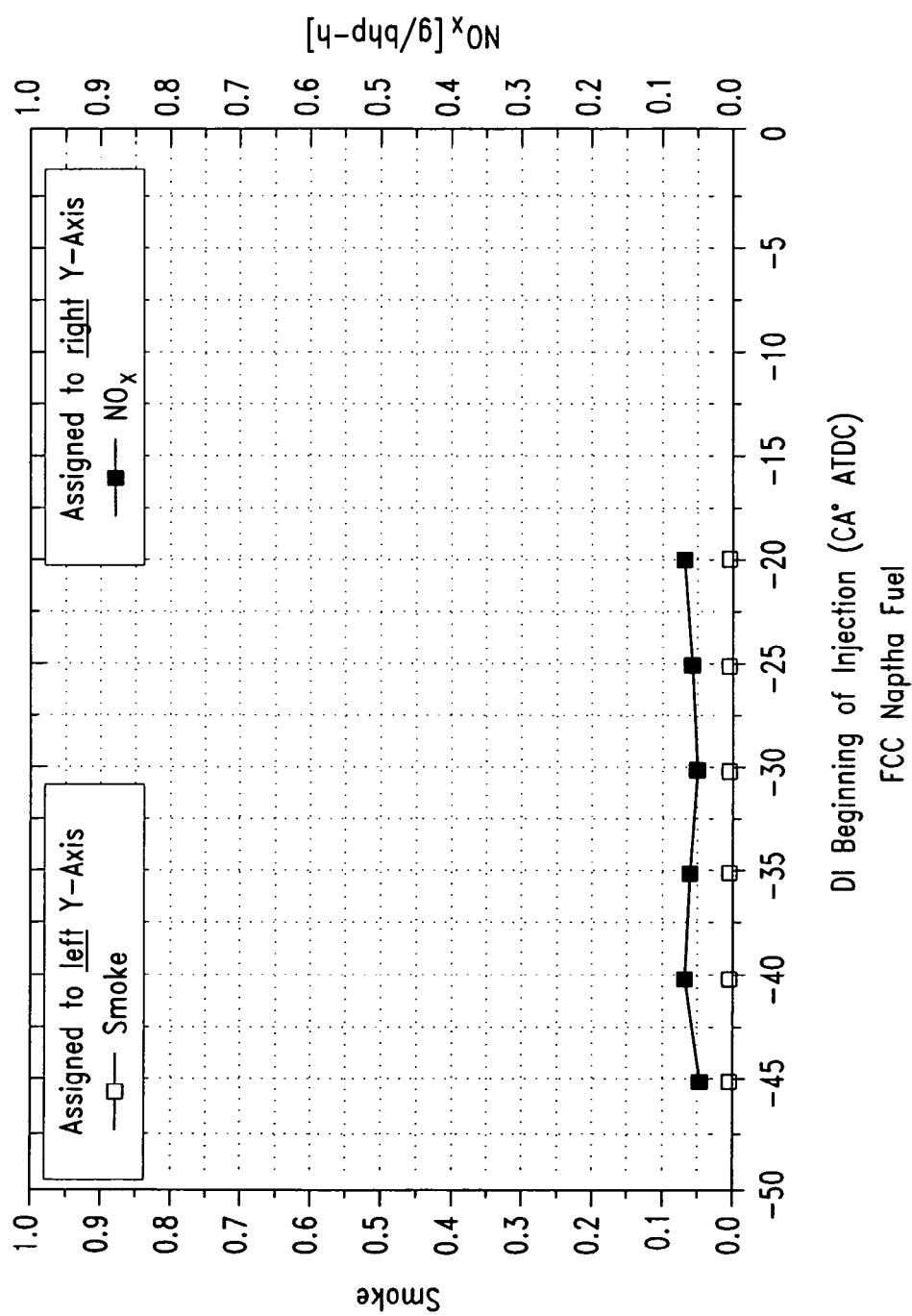
FIG. 2 is a representation of respective smoke and NOx emissions levels for the preferred fuel of the present invention in a controlled temperature combustion, direct injection, compression ignition engine.
Figure 3:
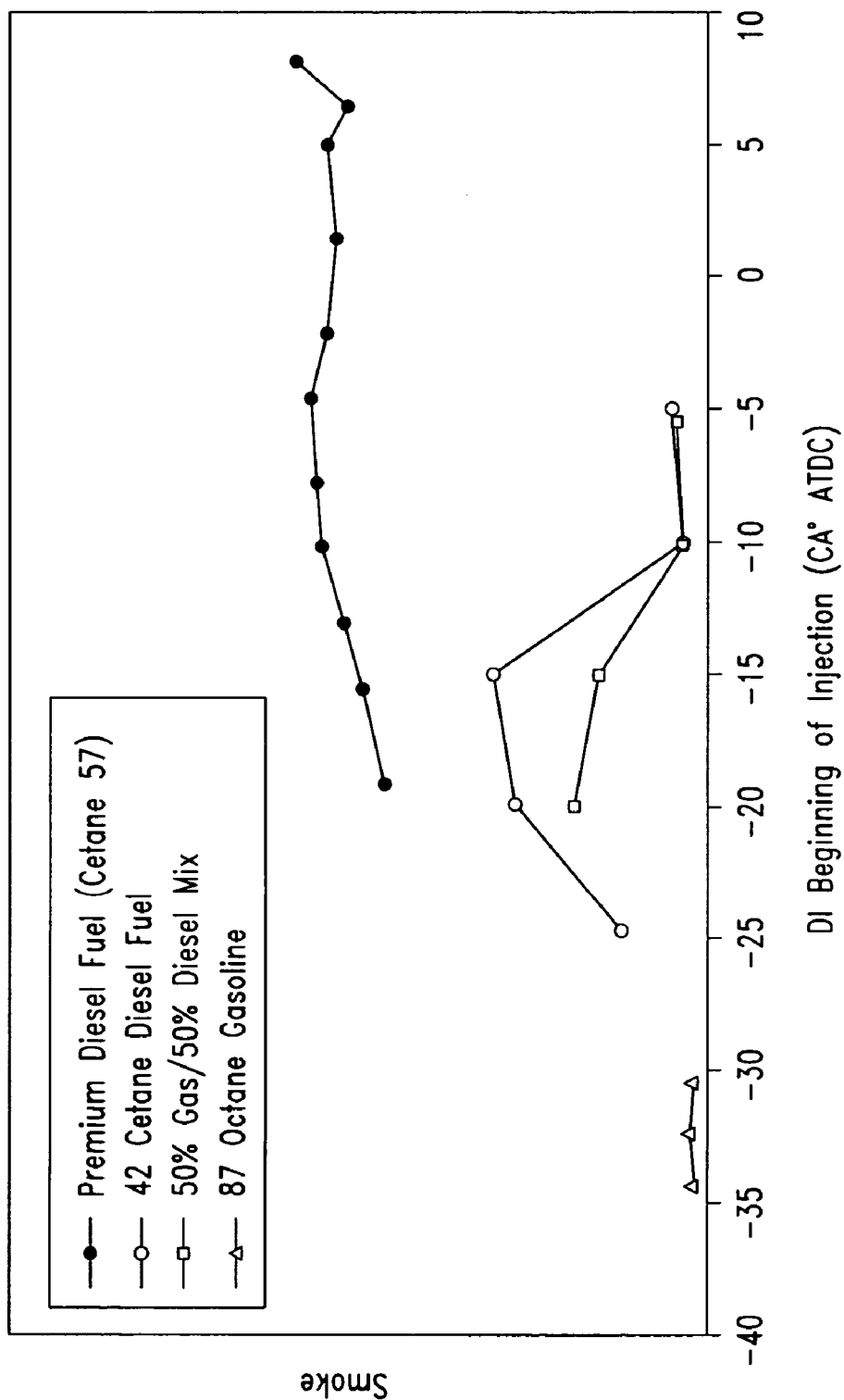
FIG. 3 is a relational representation of respective smoke emission levels for various sample alternative fuels of the present invention in a controlled temperature combustion, direct injection, compression ignition engine.

FIGS. 2 and 3 show smoke formation effects from uses of fuels with varying cetane or octane numbers at comparable operating conditions in the combustion system set forth above. The particular smoke data reported for FIGS. 2 and 3 was generated at operating conditions of 2000 RPM, a Lambda value (excess oxygen ratio) of approximately 1.3, a load of 9 bar indicated mean effective pressure (IMEP), and while maintaining engine-out NOx formation levels below 0.2 g/bhp-hr. As may be seen from these figures, smoke formation varies significantly depending on the fuel used with the applicant's low NOx direct injection compression ignition combustion system. In addition, as demonstrated in FIG. 2, use of the preferred FCC Naptha fuel for the present invention resulted in virtually smokeless combustion even at engine-out NOx levels significantly below future regulation levels, without the need for aftertreatment.

The cetane and/or octane ratings, and boiling points, of the preferred FCC Naptha fuel include a cetane rating of less than 30, an initial boiling point of 45 degrees Celsius, and an end boiling point of 116 degrees Celsius. As shown in FIG. 3, other fuels generally considered inappropriate for use with conventional automotive diesel engines, namely with cetane levels below 43 (e.g. with testing beginning with a diesel fuel with a 42.4 cetane index, shown as 42 cetane diesel fuel in FIG. 3) and octane levels up to 87, were also tested and found to reduce smoke formation over conventional automotive diesel fuel when used in conjunction with controlled temperature combustion, direct injection, compression ignition engines in the present invention. The end boiling point of the 42 cetane fuel and 50/50 gas/diesel mix tested in FIG. 3 is approximately 299 degrees Celsius. The end boiling point of the 87 octane gasoline tested in FIG. 3 is approximately 213 degrees Celsius. The premium diesel fuel tested for comparison had a cetane number of 57 and an end boiling point of approximately 328 degrees Celsius.

In discussing octane and cetane numbers for fuels, it should be noted that cetane levels significantly below 40 are usually left undetermined due to potential damage to test equipment. Cetane and octane are both well-known measures of the ignition delay quality of fuels, with fuels generally measured on only one of the two scales (with higher octane numbers indicating greater ignition delay). However, it will be accepted that fuels measured on the octane scale would be expected to have a cetane rating less than 20 (and would not be expected in the prior art to be suitable for a direct injection compression ignition engine), and, conversely, fuels measured on the cetane scale would be expected to have an octane rating less than 80 (and would not be expected in the prior art to be suitable for a gasoline spark ignition engine). For example, while the cetane rating for 87 octane gasoline is undetermined, it will be accepted that the cetane rating would certainly be less than 20, with a cetane rating likely between 5 and 20.

Significant obstacles to implementation of widespread commercial use of a new low cetane, low octane (e.g., below 80) fuel for controlled temperature combustion direct injection compression ignition engines include the present lack of infrastructure (e.g. pumps widely available to the public) for providing the fuel, and the lack of sufficient volume of vehicles that would benefit from such fuel to economically justify establishing such infrastructure. In addition, lower cetane fuels can present cold-starting challenges for certain direct injection, compression ignition engines, which discourages use of low cetane fuels for such engines. For example, use of fuel with a cetane lower than 40 may present cold starting problems at temperatures lower than around 10 degrees Fahrenheit.

Because of the foregoing, one preferred method of achieving the benefits of the present invention would be to implement the invention for a controlled fleet or fleets of vehicles. Under this preferred business method, it would become possible to significantly reduce infrastructure obstacles for use of the low cetane fuels of the present invention. As one example, for fleets with vehicles used solely with fixed long distance routes, fueling locations would only need to be provided at intermittent strategic points along such routes. As another example, for fleets with vehicles with shorter range routes from a common hub base, fueling would only need to be provided at each such hub base. Cold-starting obstacles could additionally be alleviated by avoiding fleet operation in extreme cold weather conditions or locations, or by use of external heating systems (e.g., intake charge-air heating by burners or electrical resistors, or compressors with operation of the charge-air coolers), at some additional incremental cost. Under such scenarios, the cost savings to a fleet in (1) avoiding exhaust aftertreatment costs for each of its vehicles while being able to use highly efficient (e.g. diesel) vehicles, and (2) obtaining potentially lower per gallon fuel costs because of the lower demand fuel specifications being utilized (e.g., gasoline or diesel can cost over twice as much as a refined naptha fuel), may quickly overcome the infrastructure and other costs that may be necessitated by use of the combustion system and fuel of the present invention.

Complementarily, oil refining companies could also potentially economically benefit from commercial use of such low cetane fuels. For example, commercial use of a wider range of diesel fuel specifications, as would be created by the use of low cetane fuels, could increase the percentage of crude oil that could economically be made into diesel fuel. Such increased volume used for low cetane fuels could then be provided and sold for specific use for a particular vehicle fleet or group of vehicle fleets that operates as set forth above.

From the foregoing it will be appreciated that, although specific embodiments of the applicant's inventions have been set forth herein, various modifications or alternative uses may be made of aspects of the present inventions without deviating from the spirit and scope of the inventions. The embodiments presented herein are therefore to be considered as illustrative and not restrictive as to the inventions, with the scope of the inventions limited only by the claims appended hereto.

I claim:

1. A method of operating a direct injection, compression ignition, internal combustion engine, comprising:
    supplying a combustion chamber of the engine with a compressed charge-air mixture of air and recirculated exhaust gas, wherein the oxygen concentration of the compressed charge-air mixture is between 11% and 15%;
    injecting into the combustion chamber a fuel with a cetane number between 20 and 40, thereby triggering combustion of the fuel and compressed charge-air mixture;
    maintaining peak combustion temperatures in the chamber below 2100K; and
    maintaining engine-out NOx production below 0.2 g/bhp-hr simultaneously with maintaining engine-out PM formation below 0.05 g/bhp-hr.

2. A business method, comprising:
   providing and selling fuel refined for use with motor vehicles with direct injection compression ignition internal combustion engines, wherein the fuel has a cetane number less than 40 and an octane number less than 80; and
   identifying the fuel as designed for use with a particular vehicle fleet or group of vehicle fleets.

3. The business method of claim 2, wherein the fuel has a cetane number between 5 and 35, and an end boiling point below 120 degrees Celsius.

4. The business method of claim 3, wherein the fuel has a cetane number between 20 and 30.

5. An internal combustion engine system, comprising:
   a direct injection compression ignition engine with a plurality of cylinders disposed therein, each cylinder providing a combustion chamber;
   an air intake line in fluid communication with the plurality of cylinders, to provide air to the combustion chambers;
   an exhaust line in fluid communication with the plurality of cylinders, for receiving exhaust gas exiting from the combustion chambers, and including means for recirculation of a portion of the exhaust gas to the air intake line for return to the combustion chambers;
   a compressor operatively connected to the air intake line, for compressing a charge-air mixture of air and recirculated exhaust gas, prior to intake into the combustion chambers;
   a fuel injector in communication with each of the plurality of cylinders of the engine, for injection of low cetane fuel into the combustion chambers;
   oxygen determination means, for determining an oxygen concentration of the charge-air taken into the combustion chambers before combustion;
   oxygen adjustment means, for adjusting the oxygen concentration of the charge-air taken into the combustion chambers for combustion;
   oxygen control means, for controlling adjustments to the oxygen concentration of the charge-air taken into the combustion chambers for combustion, said control means operated to maintain the oxygen concentration to a value, or range of values, below 16% for engine operation at medium or high loads;
   fuel injection control means, programmed or configured to control the timing of the injection of the fuel into the combustion chambers, wherein the timing of the injection is provided to correspond to combustion of a fuel with a cetane number between 20 and 43.

6. The internal combustion engine system of claim 5, wherein the fuel injection control means is programmed or configured to control the timing of the injection of the fuel to correspond to combustion of a fuel with a cetane number less than 40.

7. The internal combustion engine system of claim 5, wherein the fuel injection control means is programmed or configured to control the timing of the injection of the fuel to correspond to combustion of a fuel with a cetane number less than 35.

8. The internal combustion engine system of claim 5, wherein the fuel injection control means is programmed or configured to control the timing of the injection of the fuel to correspond to combustion of a fuel with a cetane number less than 30 and an octane number less than 80.

9. The internal combustion engine system of claim 5, wherein the oxygen control means is operated to maintain the oxygen concentration to a value, or range of values, between 11% and 15% for engine operation at medium or high loads.

10. The internal combustion engine system of claim 5, wherein the oxygen control means is operated to maintain the oxygen concentration to a value, or range of values, between 12% and 14% for engine operation at medium or high loads.

11. A method of operating a fleet of vehicles, comprising:
    operating a fleet of vehicles with direct injection compression ignition internal combustion engine systems with peak in-cylinder engine combustion temperatures managed to below 2100K; and
    providing the fleet of vehicles with fuel with a cetane number between 5 and 40, and an octane number below 80.

12. The method of claim 11, wherein the fuel has a cetane number between 20 and 40.

13. The method of claim 11, further comprising establishing an infrastructure of fuel stations along common routes for the vehicles in the fleet.

14. The method of claim 11, further comprising maintaining engine-out NOx emissions for the vehicles below 0.2 g/bhp-hr simultaneously with maintaining engine-out PM formation below 0.05 g/bhp-hr.

15. The method of claim 11, further comprising providing the vehicles with engine control means to adjust fuel injection timing corresponding to the octane or cetane of fuel used for combustion in the engines, to allow operation of the vehicles with fuels of varying octane or cetane ratings.

16. The method of claim 11, further comprising operating the fleet of vehicles only in climate conditions above 10 degrees Fahrenheit during fleet operation.

17. The method of claim 11, further comprising operating the fleet of vehicles only in climate conditions above 20 degrees Fahrenheit during fleet operation.

18. The method of claim 11, further comprising operating the fleet of vehicles only in climate conditions above 35 degrees Fahrenheit during fleet operation.

19. The method of claim 11, further comprising providing the vehicles with external heating means for cold-start operation.

20. A method of operating a direct injection, compression ignition, internal combustion engine, comprising:
    supplying a combustion chamber of the engine with a compressed charge-air mixture of air and recirculated exhaust gas;
    injecting into the combustion chamber a fuel with a cetane number between 5 and 43, thereby triggering combustion of the fuel and compressed charge-air mixture;
    maintaining peak combustion temperatures in the chamber below 2100K, including at medium or high loads; and
    maintaining engine-out NOx production below 0.5 g/bhp-hr simultaneously with maintaining engine-out smoke levels below 3 BSN.

21. The method of claim 20, wherein the fuel additionally has an octane number below 80.

22. The method of claim 20, wherein the fuel has an end boiling point of 300 degrees Celsius or less.

23. The method of claim 20, wherein the fuel has a cetane number between 5 and 40.

24. The method of claim 20, wherein the fuel has a cetane number between 5 and 20.

25. The method of claim 20, further comprising maintaining an oxygen concentration of the compressed charge-air mixture below 16%.

26. The method of claim 20, further comprising maintaining an oxygen concentration of the compressed charge-air mixture below 15%.

27. The method of claim 20, further comprising maintaining an oxygen concentration of the compressed charge-air mixture below 14%.

28. The method of claim 20, further comprising maintaining an oxygen concentration of the compressed charge-air mixture between 11% and 15%.

29. The method of claim 20, further comprising maintaining an oxygen concentration of the compressed charge-air mixture between 12% and 14%.

30. The method of claim 20, wherein the fuel has a cetane number between 5 and 30, and an octane number below 80.

31. The method of claim 30, wherein the fuel has an end boiling point of 120 degrees Celsius or less.

32. The method of claim 20, wherein the fuel has a cetane number between 5 and 35.

33. The method of claim 32, wherein the fuel has an end boiling point between 100 degrees Celsius and 300 degrees Celsius.

34. The method of claim 32, wherein the fuel has an end boiling point of 300 degrees Celsius or less and an octane number below 80.

35. The method of claim 20, further comprising maintaining engine-out NOx production below 0.2 g/bhp-hr simultaneously with maintaining engine-out smoke formation below 3 BSN.

36. The method of claim 35, further comprising simultaneously maintaining engine-out smoke formation below 1.5 BSN.

37. The method of claim 35, further comprising simultaneously maintaining engine-out smoke formation below 0.5 BSN.

38. The method of claim 35, further comprising simultaneously maintaining engine-out PM formation below 0.01 g/bhp-hr.

* * * * *